United States Patent
Brew et al.

(10) Patent No.: US 9,808,794 B2
(45) Date of Patent: Nov. 7, 2017

(54) HONEYCOMB CERAMIC SUBSTRATES, HONEYCOMB EXTRUSION DIES, AND METHODS OF MAKING HONEYCOMB CERAMIC SUBSTRATES

(71) Applicant: Corning Incorporated, Corning, NY (US)

(72) Inventors: Thomas William Brew, Corning, NY (US); Jeffrey O Foster, Horseheads, NY (US); Steven John Kremer, Big Flats, NY (US); Bryan Michael Miller, Addison, NY (US)

(73) Assignee: Corning Incorporated, Corning, NY (US)

( * ) Notice: Subject to any disclaimer, the term of this patent is extended or adjusted under 35 U.S.C. 154(b) by 14 days.

(21) Appl. No.: 14/033,883

(22) Filed: Sep. 23, 2013

(65) Prior Publication Data

US 2015/0087507 A1 Mar. 26, 2015

(51) Int. Cl.
*B01D 39/06* (2006.01)
*B01D 39/14* (2006.01)
(Continued)

(52) U.S. Cl.
CPC ............ *B01J 35/04* (2013.01); *B01D 46/247* (2013.01); *B28B 3/269* (2013.01);
(Continued)

(58) Field of Classification Search
CPC ............ B01D 46/247; B01D 46/2451; B01D 2046/2496; B01D 46/2429; F01N 2330/36
See application file for complete search history.

(56) References Cited

U.S. PATENT DOCUMENTS

| 5,714,228 A | 2/1998 | Beckmeyer et al. ......... 428/118 |
| 5,731,562 A | 3/1998 | Beckmeyer et al. ...... 219/69.12 |

(Continued)

FOREIGN PATENT DOCUMENTS

| CN | 101259367 A | 9/2008 |
| CN | 101549523 A | 10/2009 |

(Continued)

OTHER PUBLICATIONS

International Search Report, dated Sep. 18, 2014 PCT/US2014/056264.

(Continued)

*Primary Examiner* — Amber R Orlando
(74) *Attorney, Agent, or Firm* — Jakub M. Michna

(57) ABSTRACT

A honeycomb ceramic substrate, a method of making thereof, and a honeycomb extrusion die configured to extrude a honeycomb ceramic substrate from a batch of ceramic or ceramic-forming material is provided. The substrate may include a lattice of intersecting walls defining a honeycomb network of flow channels extending between an inlet end and an outlet end of the honeycomb substrate. Each flow channel may be defined by a plurality of channel walls of the intersecting walls with at least two of the plurality of channel walls including concave inner surfaces facing a center of the corresponding flow channel from central portions of the concave inner surfaces to concave corner portions facing the center of the corresponding flow channel.

6 Claims, 15 Drawing Sheets

(51) Int. Cl.
- B01D 39/20 (2006.01)
- B01D 50/00 (2006.01)
- B01J 35/04 (2006.01)
- B29C 47/00 (2006.01)
- B29C 47/30 (2006.01)
- B01D 46/24 (2006.01)
- B28B 3/26 (2006.01)
- C04B 38/00 (2006.01)
- F01N 3/28 (2006.01)

(52) U.S. Cl.
CPC .......... *B29C 47/0028* (2013.01); *B29C 47/30* (2013.01); *C04B 38/0009* (2013.01); *B01D 2046/2496* (2013.01); *F01N 3/2828* (2013.01)

(56) References Cited

U.S. PATENT DOCUMENTS

| | | | |
|---|---|---|---|
| 5,952,079 A * | 9/1999 | Andou et al. | 428/116 |
| 6,159,431 A * | 12/2000 | Inoue et al. | 422/180 |
| 6,803,087 B2 | 10/2004 | Brew et al. | 428/116 |
| 7,247,184 B2 | 7/2007 | Frost | 55/523 |
| 7,504,146 B2 | 3/2009 | Ando et al. | 428/116 |
| 7,597,948 B2 | 10/2009 | Miller | 428/116 |
| 7,601,194 B2 | 10/2009 | Beall et al. | 55/523 |
| 7,674,513 B2 | 3/2010 | Ahmed et al. | 428/116 |
| 7,807,250 B2 | 10/2010 | Beall et al. | 428/116 |
| 8,318,286 B2 | 11/2012 | Patchett et al. | 428/117 |
| 8,637,426 B2 * | 1/2014 | Hoke et al. | 502/339 |
| 8,865,084 B2 | 10/2014 | Bubb et al. | |
| 2003/0165662 A1 * | 9/2003 | Suwabe et al. | 428/116 |
| 2004/0161583 A1 | 8/2004 | Brew et al. | 428/116 |
| 2004/0162218 A1 | 8/2004 | Choi | 502/439 |
| 2005/0274097 A1 | 12/2005 | Beall et al. | 55/523 |
| 2006/0019061 A1 | 1/2006 | Oshimi et al. | 428/116 |
| 2007/0130897 A1 * | 6/2007 | Sakaguchi et al. | 55/523 |
| 2007/0160943 A1 | 7/2007 | Lex et al. | 431/215 |
| 2008/0017520 A1 * | 1/2008 | Koishikura et al. | 205/640 |
| 2008/0072573 A1 | 3/2008 | Carranza et al. | 60/274 |
| 2008/0271422 A1 * | 11/2008 | Zawisza | 55/419 |
| 2008/0317999 A1 | 12/2008 | Patchett et al. | 428/116 |
| 2010/0062213 A1 | 3/2010 | Kondo | 428/118 |
| 2010/0160158 A1 * | 6/2010 | Ando et al. | 502/439 |
| 2011/0020185 A1 * | 1/2011 | Vincent et al. | 422/122 |
| 2013/0136663 A1 * | 5/2013 | Bubb et al. | 422/177 |

FOREIGN PATENT DOCUMENTS

| | | |
|---|---|---|
| JP | 2010000427 | 1/2010 |
| JP | 2011189252 | 9/2011 |
| WO | 2007/040348 | 4/2007 |

OTHER PUBLICATIONS

Written Opinion of the International Searching Authority dated Sep. 18, 2014 PCT/US2014/056264.

* cited by examiner

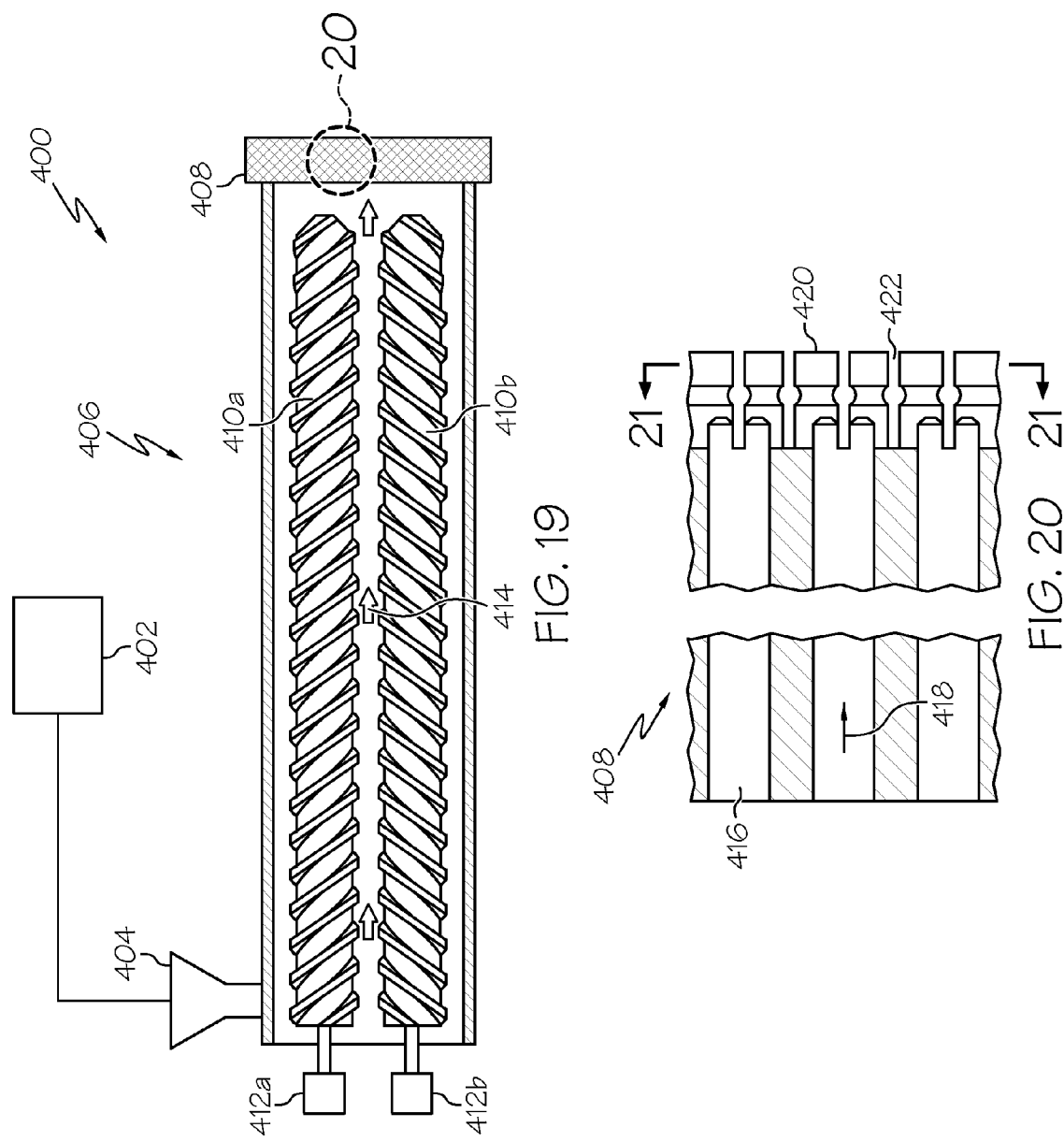

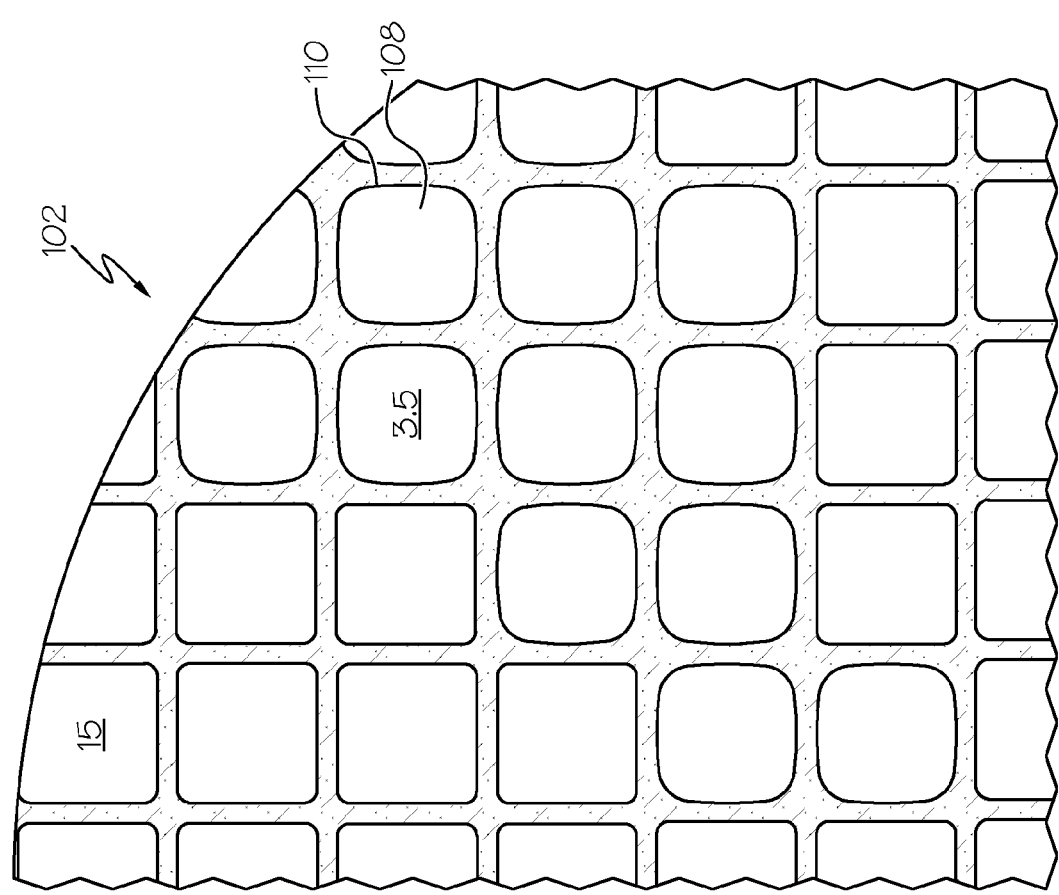

HONEYCOMB CERAMIC SUBSTRATES, HONEYCOMB EXTRUSION DIES, AND METHODS OF MAKING HONEYCOMB CERAMIC SUBSTRATES

FIELD

The following description relates generally to substrates, extrusion dies for making substrates and methods of making substrates and, more particularly, to honeycomb ceramic substrates, honeycomb extrusion dies and methods of making honeycomb ceramic substrates.

BACKGROUND

In the automotive industry, honeycomb ceramic substrates are often employed to support a catalyst to reduce harmful emissions from a combustion engine. Typically, such ceramic substrates include a lattice of walls defining flow channels including a rectangular (e.g., square) or other cross sectional shape.

SUMMARY

In the examples described herein, a honeycomb ceramic substrate may be created by extrusion from a batch of ceramic or ceramic-forming material using a die with die pins arranged in a shape designed to optimize the flow channel structure of the resultant substrate with respect to a variety of attributes, such as, for example, open frontal area, geometric surface area, and strength. The optimized flow channel structure may have channel walls with concave inner surfaces and concave corner portions, thereby providing a flow channel structure that is, for example, elliptical in nature. This optimized flow channel structure may result in improved product performance in substantially all areas of measurement, including coating efficiency by minimizing corner coating build-up.

In a first example aspect, a honeycomb ceramic substrate includes a lattice of intersecting walls defining a honeycomb network of flow channels extending between an inlet end and an outlet end of the honeycomb substrate. Each flow channel is defined by a plurality of channel walls of the intersecting walls with at least two of the plurality of channel walls including concave inner surfaces facing a center of the corresponding flow channel from central portions of the concave inner surfaces to concave corner portions facing the center of the corresponding flow channel. The concave corner portions are where each of the plurality of channel walls intersects with another one of the plurality of channel walls.

In one example of the first aspect, a peripheral cross-sectional shape of at least one of the flow channels is substantially defined by the equation:

$$\left|\frac{x}{a}\right|^n + \left|\frac{y}{b}\right|^m = 1,$$

wherein a and b are rectangular-fitted half-lengths along an x direction and a y direction, respectively, of the inner surfaces of channel walls defining each flow channel on either side of a y axis and an x axis, respectively, wherein x and y represent coordinates (x, y) of the inner surfaces of the channel walls defining each flow channel in the x direction and the y direction, respectively, wherein $-a \leq x \leq a$, wherein $-b \leq y \leq b$, and wherein n and m are exponents defining a degree of curvature of the channel walls. In one example, at least one of n and m are in a range of from about 2.5 to about 10. In another example, a and b are independently in a range of from about 330 microns to about 1.829 mm. In still another example, n and m are varied across the plurality of flow channels.

In another example of the first aspect, the channel walls are continuously curving around the center of the corresponding flow channel.

The first aspect may be provided alone or in combination with any one or more of the examples of the first aspect discussed above.

In a second example aspect, a method of making a honeycomb ceramic substrate is provided. The method includes extruding a ceramic or ceramic-forming batch material through a honeycomb extrusion die to form green honeycomb substrate including a lattice of intersecting walls defining a honeycomb network of flow channels extending between an inlet end and an outlet end of the green honeycomb substrate. Each flow channel is defined by a plurality of channel walls of the intersecting walls with at least two of the plurality of channel walls including concave inner surfaces facing a center of the corresponding flow channel from central portions of the concave inner surfaces to concave corner portions facing the center of the corresponding flow channel. The concave corner portions are where each of the plurality of channel walls intersects with another one of the plurality of channel walls. The method further includes drying the green honeycomb substrate, and firing the green honeycomb substrate into the honeycomb ceramic substrate.

In one example of the second aspect, a peripheral cross-sectional shape of at least one of the flow channels is substantially defined by the equation:

$$\left|\frac{x}{a}\right|^n + \left|\frac{y}{b}\right|^m = 1,$$

wherein a and b are rectangular-fitted half-lengths along an x direction and a y direction, respectively, of the inner surfaces of channel walls defining each flow channel on either side of a y axis and an x axis, respectively, wherein x and y represent coordinates (x, y) of the inner surfaces of the channel walls defining each flow channel in the x direction and the y direction, respectively, wherein $-a \leq x \leq a$, wherein $-b \leq y \leq b$, and wherein n and m are exponents defining a degree of curvature of the channel walls. In one example, at least one of n and m is in a range of from about 2.5 to about 10. In another example, a and b are independently in a range of from about 330 microns to about 1.829 mm. In another example, n and m are varied across the plurality of the flow channels.

In another example of the second aspect, the channel walls are continuously curved around the center of the corresponding flow channel.

The second aspect may be provided alone or in combination with any one or more of the examples of the second aspect discussed above.

In a third example aspect, a honeycomb extrusion die configured to extrude a honeycomb ceramic substrate from a batch of ceramic or ceramic-forming material is provided.

The honeycomb extrusion die includes a plurality of die pins arranged in a matrix and spaced from one another to define a lattice of intersecting slots defined between the die pins at an outer face of the die pins. An outer periphery at the outer face of at least one of the die pins includes a plurality of sides joined by corresponding corner portions with at least two convex sides facing away from a center of the corresponding die pin from central portions of the convex sides to the corresponding corner portions of the convex sides. At least one corner portion is convex facing away from the center of the corresponding die pin.

In one example of the third aspect, at least one wall slot is defined between facing sides of two adjacent die pins of the plurality of die pins. Each of the facing sides are convex facing each other from central portions thereof to corresponding corner portions of the facing sides. The wall slot is concave toward central portions of the two adjacent die pins.

In another example of the third aspect, a shape of the outer periphery of the outer face of the at least one of the die pins is substantially defined by the equation:

$$\left|\frac{x}{a}\right|^n + \left|\frac{y}{b}\right|^m = 1,$$

wherein a and b are rectangular-fitted half-lengths along an x direction and a y direction, respectively, of the sides of the die pins on either side of a y axis and an x axis, respectively, wherein x and y represent coordinates (x, y) of the sides of the die pins in the x direction and the y direction, respectively, wherein $-a \leq x \leq a$, wherein $-b \leq y \leq b$, and wherein n and m are exponents defining a degree of curvature of the sides of the die pins. In one example, at least one of n and m is in a range of from about 2.5 to about 10. In another example, a and b are independently in a range of from about 330 microns to about 1.829 mm. In another example, n and m are varied across the plurality of the die pins.

In a further example of the third aspect, the sides of each of the die pins are symmetric to each other.

In still a further example of the third aspect, the sides of each of the die pins are continuously curved around the center of the corresponding die pin.

The third aspect may be provided alone or in combination with any one or more of the examples of the third aspect discussed above.

BRIEF DESCRIPTION OF THE DRAWINGS

The above and other features, aspects and advantages of the present disclosure are better understood when the following detailed description of the disclosure is read with reference to the accompanying drawings, in which:

FIG. 19 is a schematic view illustrating an example of an extrusion apparatus in accordance with example aspects of the disclosure;

FIG. 20 is an enlarged partial schematic sectional view illustrating an example of a die member in accordance with example aspects of the disclosure taken at view 20 of FIG. 19;

FIGS. 23-25 are enlarged views illustrating examples of the honeycomb ceramic substrate in accordance with example aspects of the disclosure.

DETAILED DESCRIPTION

Figure 1:
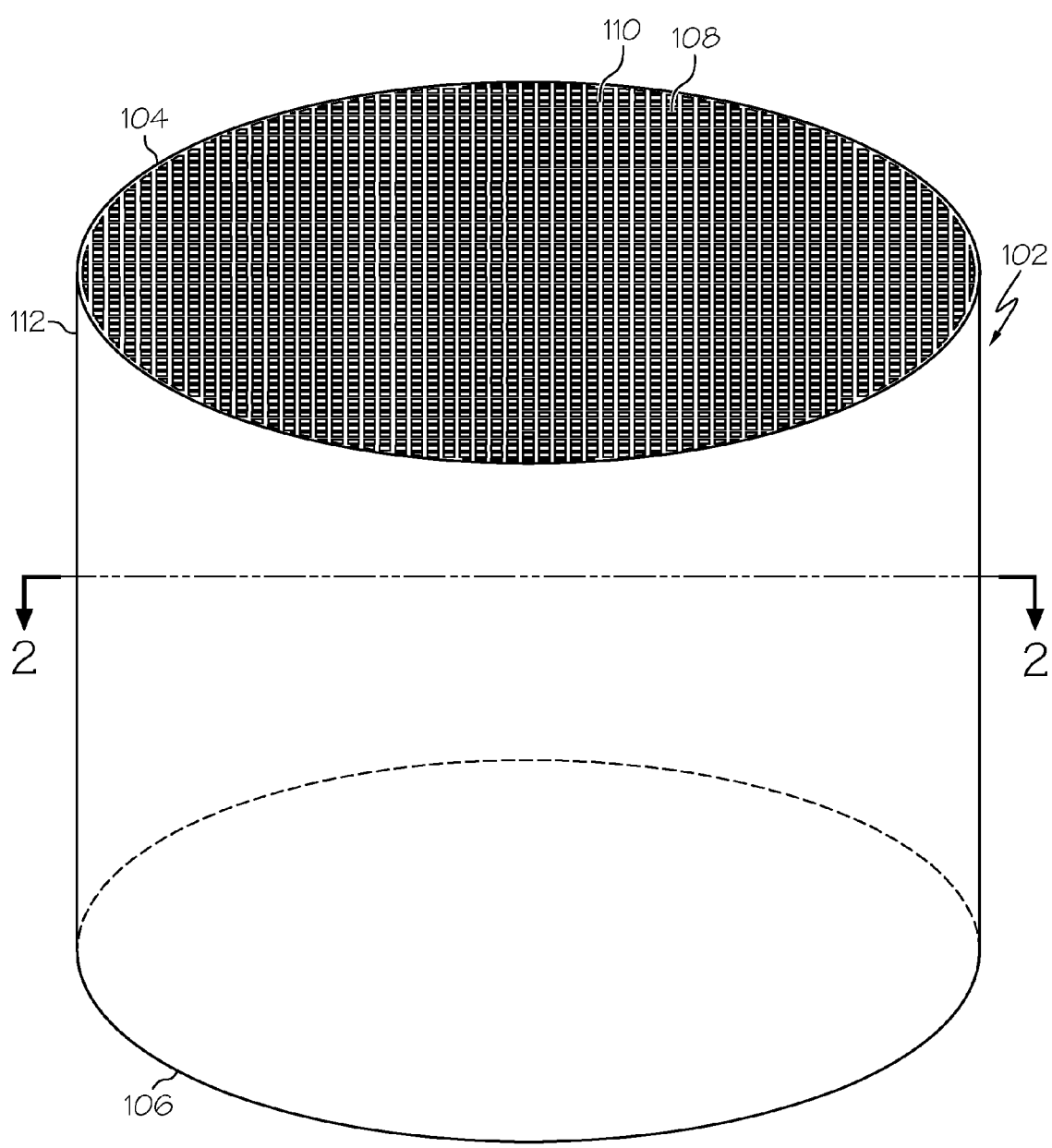
FIG. 1 is a perspective view illustrating an example of a honeycomb ceramic substrate in accordance with example aspects of the disclosure.

The disclosure will now be described more fully hereinafter with reference to the accompanying drawings in which example embodiments are shown. Whenever possible, the same reference numerals are used throughout the drawings to refer to the same or like parts. However, the disclosure may be embodied in many different forms and should not be construed as limited to the embodiments set forth herein. These example embodiments are provided so that this disclosure will be both thorough and complete.

FIG. 1 is a perspective view illustrating an example of a honeycomb ceramic substrate 102. The honeycomb ceramic substrate 102 is not necessarily drawn to scale and illustrated only one example schematic representation of a honeycomb ceramic substrate 102. The honeycomb ceramic substrate 102 includes an inlet end 104 and an outlet end 106 positioned opposite from the inlet end 104. A lattice of intersecting walls defining a honeycomb network of flow channels 108 extend between the inlet end 104 and outlet end 106. In one example, substantially all of the flow channels 108 are not plugged and therefore provide for an unobstructed pass flow from the inlet end 104 to the outlet end 106 of the honeycomb ceramic substrate 102.

Figure 2:
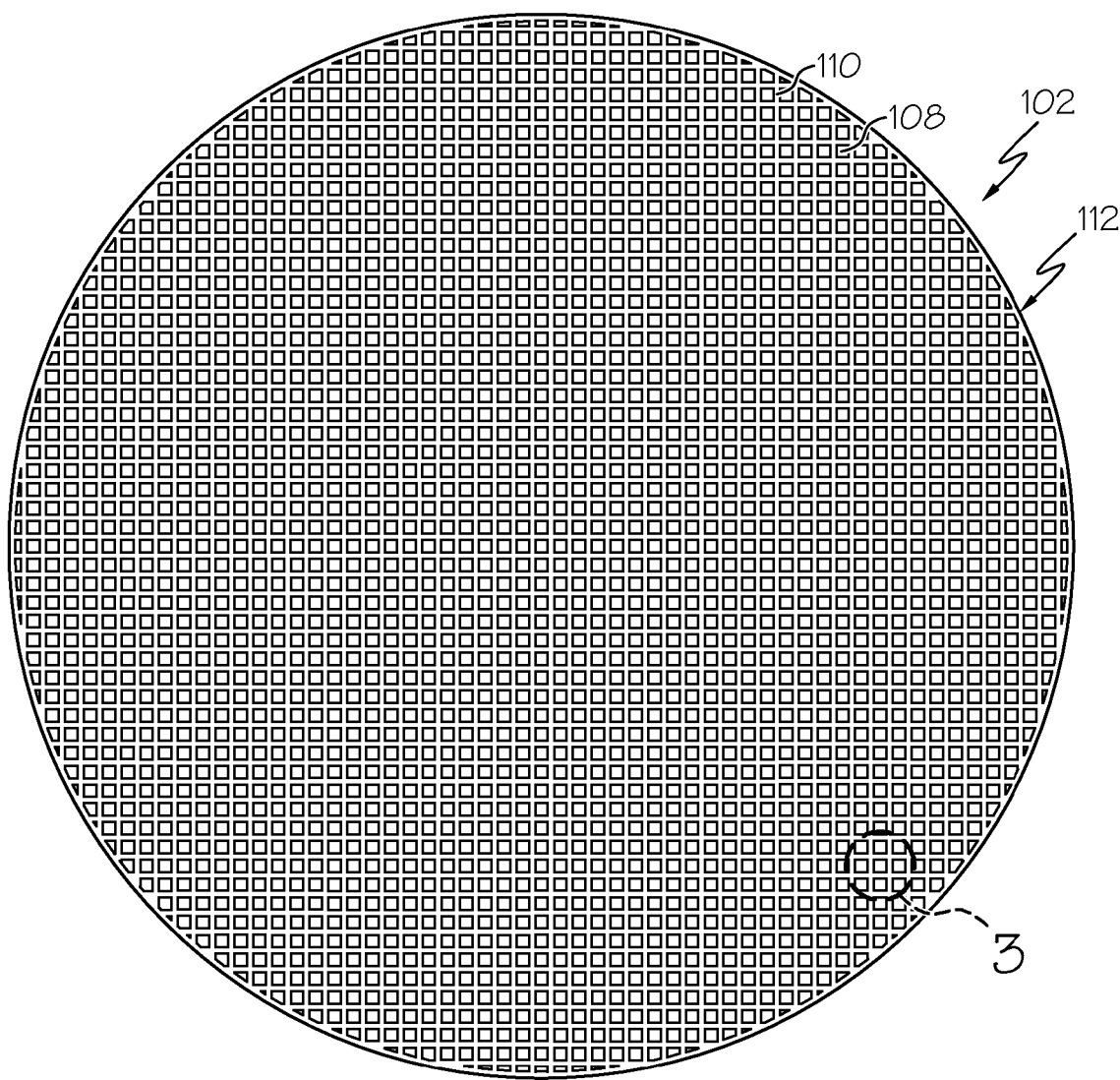
FIG. 2 is a schematic sectional view illustrating an example of the honeycomb ceramic substrate in accordance with example aspects of the disclosure along line 2-2 of FIG. 1.

FIG. 2 is a schematic sectional view illustrating an example of the honeycomb ceramic substrate 102 in accordance with example aspects of the disclosure along line 2-2 of FIG. 1. As shown in FIG. 2, the flow channels 108 can be formed by a plurality of channel walls 110 of the intersecting walls extending longitudinally between the inlet end 104 and outlet end 106 of the honeycomb ceramic substrate 102. The flow channels 108 and the channel walls 110 can each extend in a substantially parallel orientation longitudinally between the inlet end 104 and the outlet end 106. As further illustrated, the honeycomb ceramic substrate 102 may include an outer skin defining an outer surface 112 that can extend longitudinally between the inlet end 104 and outlet end 106. As shown, the outer surface 112 can comprise a circular cylindrical shape having a circular cross-sectional profile. In further examples, the outer surface 112 may have an elliptical, polygonal or other shape. For example, although not shown, the outer surface 112 may have a polygonal shape such as triangular, rectangular (e.g., square) or other polygonal shape. Moreover, as shown, the honeycomb ceramic substrate 102 can comprise a single monolithic substrate although the substrate may comprise a segmented substrate wherein many substrates are mounted parallel to one another to provide the desired overall cross sectional configuration. Whether a single monolithic or segmented substrate, various geometries may be incorporated in accordance with aspects of the disclosure. For example, the substrates may comprise a rectangular (e.g., square) cross-sectional outer periphery or other polygonal shape having three or more sides. In further examples, the substrates may have an outer cross-sectional periphery that is circular, oval, or other curved shape.

The honeycomb ceramic substrate 102 can have a variety of cell densities, such that a larger or smaller number of flow channels 108 can be provided per unit area. For instance, the channel density can be in the range of from about 7.75 channels/cm² (50 channels/in²) to about 232.5 channels/cm² (1500 channels/in²) of the honeycomb ceramic substrate 102 cross-section. As such, the examples shown in FIGS. 1 and 2 are not intended to be limiting, as various ranges of cell densities may be provided in accordance with aspects of the disclosure.

Figure 3:
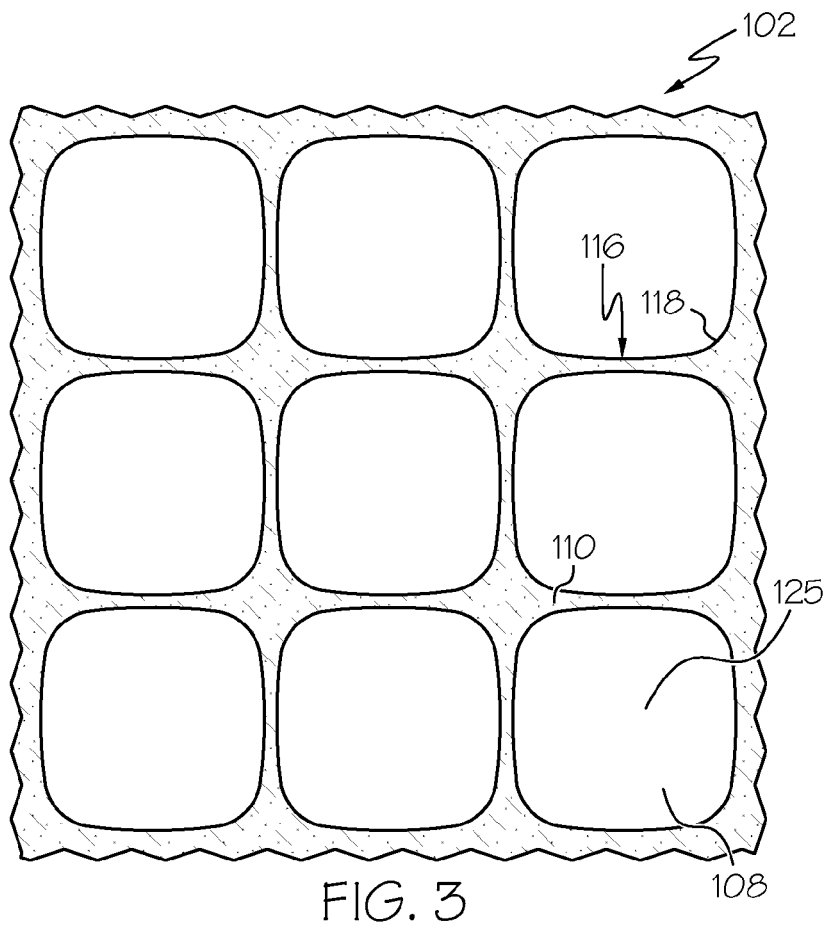
FIG. 3 is an enlarged view illustrating an example of the honeycomb ceramic substrate in accordance with example aspects of the disclosure taken at view 3 of FIG. 2.
Figure 4:
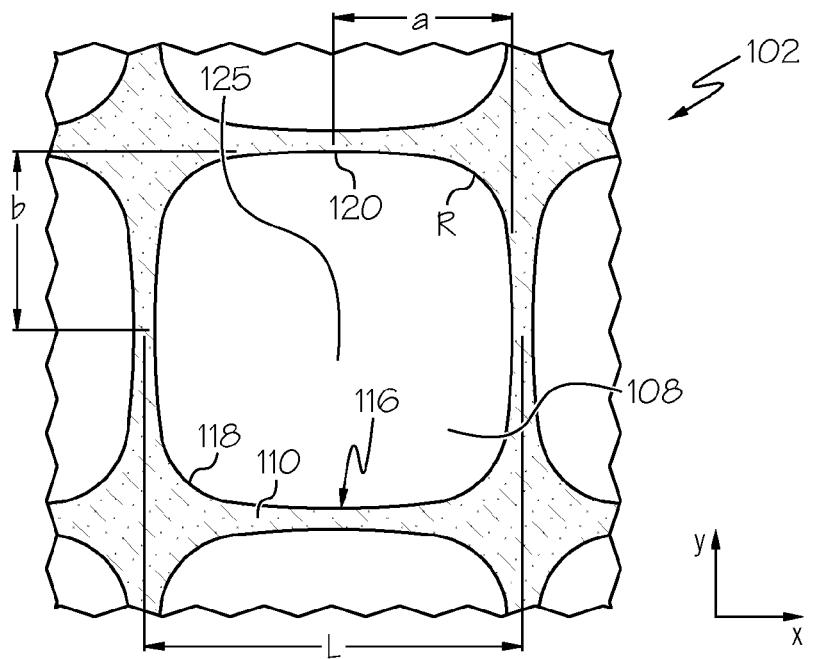
FIG. 4 is an enlarged view of FIG. 3.
Figure 5:
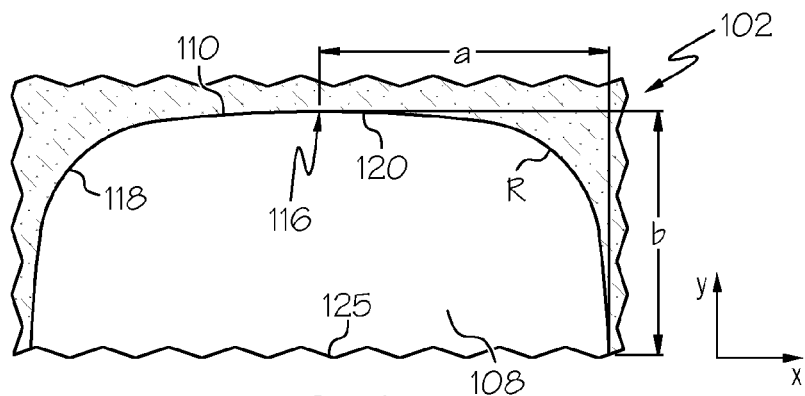
FIG. 5 is an enlarged view of FIG. 4.

In further examples, the channel wall constructions forming the flow channels 108 can have different configurations. FIG. 3 is an enlarged view illustrating an example of the honeycomb ceramic substrate 102 in accordance with example aspects of the disclosure taken at view 3 of FIG. 2. For illustration purposes, FIG. 3 shows a grouping of nine flow channels 108. FIG. 4 is an enlarged view of FIG. 3 illustrating an example of a flow channel 108 of the honeycomb ceramic substrate 102 in accordance with example aspects of the disclosure. FIG. 5 is an enlarged view of FIG. 4, illustrating demonstrating further features of the example flow channel 108. FIGS. 6-12 are enlarged views of alternative honeycomb ceramic substrates 102a-g, respectively, that are similar to the honeycomb ceramic substrate 102 of FIGS. 3-5 but illustrating various alternative flow channel 108a-g configurations in accordance with aspects of the disclosure. In each of the example honeycomb ceramic substrates, for example as illustrated in FIGS. 1-12, the flow channel structure may have channel walls with concave inner surfaces and concave corner portions. Indeed, the channel walls including concave inner surfaces and concave corner portions are noticeably shown in FIGS. 1-6 and 10, and would also be more noticeably illustrated in enlarged views of the channel walls and corner portions of the flow channel structure illustrated in FIGS. 7-9, 11 and 12. This optimized flow channel structure may result in improved product performance in substantially all areas of measurement, including coating efficiency by minimizing corner coating build-up.

In the examples shown in FIGS. 3-12, each flow channel 108, 108a-g is defined by a plurality of intersecting channel walls 110 with at least two of the plurality of channel walls 110 including concave inner surfaces 116 facing a center 125 of the corresponding flow channel 108 from central portions 120 of the concave inner surfaces 116 to concave corner portions 118 facing the center 125 of the corresponding flow channel 108. The concave corner portions 118 are where each of the plurality of channel walls 110 intersects with another one of the plurality of channel walls 110. The arrangement of flow channels 108 illustrated in FIGS. 3-6 and 10 are generally elliptical with concave channel walls 110 and the concave corner portions 118 continuously curving around the center 125 of the corresponding flow channel 108. Further examples, e.g., as illustrated in FIGS. 7-9, 11 and 12, may have flow channels 108 with a square-like or rectangle-like configuration with concave channel walls 110 and concave corner portions 118 continuously curving around the center 125 of the corresponding flow channel 108.

As mentioned above, the flow channels 108 of the honeycomb ceramic substrate 102 may be a superellipse, also known as a Lame curve, generally elliptical or even square-like or rectangular-like with concave channel walls and concave corner portions in order to obtain an optimized flow channel shape for an open frontal area (OFA) and a geometric surface area (GSA) of the flow channels 108. By controlling the length of the channel walls 110 and a degree of curvature of the channel walls 110 and corner portions 118, various desired flow channel shapes may be obtained. For example, a peripheral cross-sectional shape of at least one of the flow channels 108 may be substantially defined by Equation (I).

$$\left|\frac{x}{a}\right|^n + \left|\frac{y}{b}\right|^m = 1 \qquad (I)$$

As is illustrated in FIGS. 4 and 5, a and b are rectangular-fitted half-lengths along an x direction and a y direction, respectively, of the inner surfaces 116 of channel walls 110 defining each flow channel 108 on either side of a y axis and an x axis, respectively. In other words, a and b represent the half-lengths along an x and y direction, respectively, if the channel walls 110 were truly straight to provide a square or rectangular flow channel 108. The dimensions a and b serve to define the density of flow channels 108 and the channel wall 110 thickness between the flow channels 108 in the honeycomb ceramic substrate 102. The references x and y represent coordinates (x, y) of the inner surfaces 116 of the channel walls 110 defining each flow channel 108 in the x direction and they direction, respectively. Further, $-a \leq x \leq a$ and $-b \leq y \leq b$. Moreover, n and m are exponents defining a degree of curvature of the channel walls 110.

In an example, at least one of n and m may be in a range of from about 2.5 to about 10. In another example, a and b may be independently in a range of from about 330 microns (0.013 inches) to about 1.829 mm (0.072 inches). In a further example, a thickness of the plurality of channel walls 110 between adjacent ones of the flow channels 108 may be in a range of from about 25.4 microns (0.001 inches) to about 482.6 microns (0.019 inches).

In yet another example, the channel walls 110 in each flow channel 108 may have substantially identical lengths. In further examples, at least two of the channel walls 110 in each flow channel 108 may have a length that is the same. Additionally, the channel walls 110 of each flow channel 108 may be symmetric to each other.

Equation (I) results in a flow channel 108 having gently curved inner surfaces 116 with more pronounced curved corners 118. Even with corners 118 that have a more pronounced curvature than the gently curved inner surfaces 116, each of the channel walls 110 of the flow channels 108 are continuously curved toward a center 125 of the corresponding flow channel 108 throughout the length of the channel wall between corresponding concave corner portions. In further examples, the entire inner surface of the flow channel is continuously concave about the entire periphery of the flow channel, wherein the inner surface is defined by gently concave channel walls 110 and more pronounced concave corner portions 118 that seamlessly transition with one another about the inner periphery of the inner surface of the flow channels.

The exponents n and m of Equation (I) are tuned, depending on the flow channel density and a thickness of the channel walls 110 between adjacent flow channels, to meet the above-referenced attributes in order to minimize coating buildup in the corner portions 118 and maximize open frontal area. The examples illustrated in FIGS. 6-12 demonstrate the power that an adjustment of the exponents n and m may implement on a curvature degree of the flow channels 108 and a concavity of the inner surfaces 116. More particular, FIGS. 6-12 illustrate that, according Equation (I), the concavity of the inner surfaces 116 may be maintained at the same time a curvature degree of the flow channels 108a-g is decreased.

Figure 6:
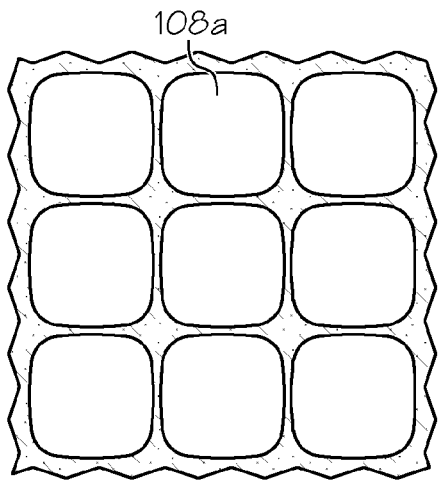
FIGS. 6-12 are enlarged views similar to FIG. 3 but illustrating various alternative example honeycomb ceramic substrate configurations.
Figure 7:
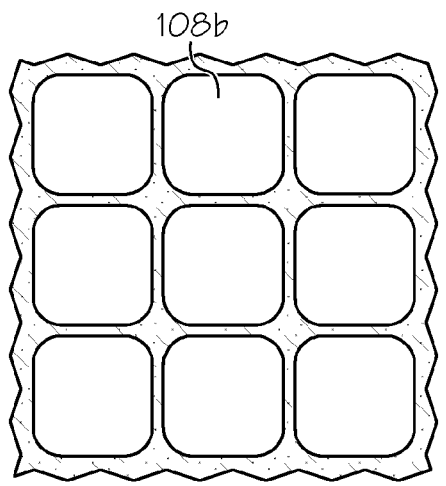
Figure 8:
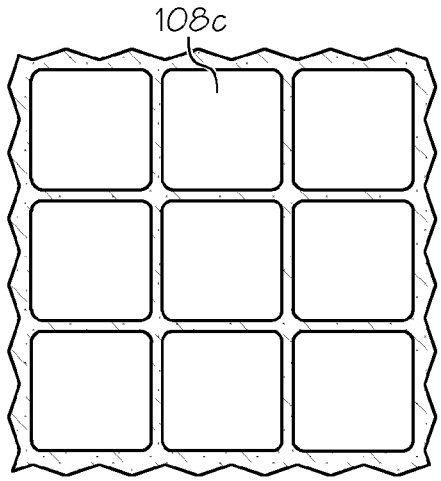
Figure 9:
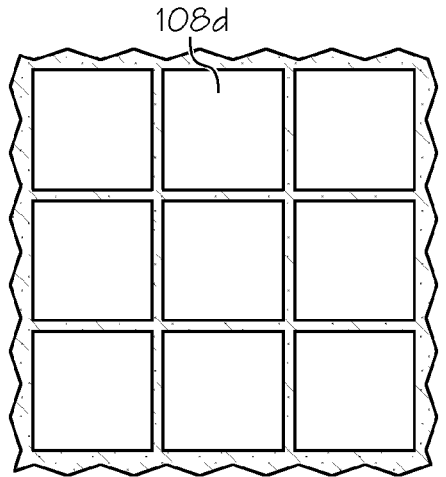

For example, FIGS. 6-9 are representative of honeycomb ceramic substrates 102a-g having a flow channel density of 69.75 channels/cm² (450 channels/in²) and a thickness of the plurality of channel walls 110 between adjacent ones of the flow channels 108 of 635 microns (0.025 inches). However, FIGS. 6-9 each represent honeycomb ceramic substrates 102 in which exponents n and m have been tuned. FIG. 6 represents a honeycomb ceramic substrate 102a with n and m equaling 3.6. FIG. 7 represents a honeycomb ceramic substrate 102b with n and m equaling 4.0. FIG. 8 represents a honeycomb ceramic substrate 102c with n and m equaling 10. FIG. 9 represents a honeycomb ceramic substrate 102d with n and m equaling 50. As can be seen by a comparison of FIGS. 6-9, both a degree to which a flow channel 108 is curved and a concavity of the inner surfaces 116 can be changed by varying the exponents n and m.

Figure 10:
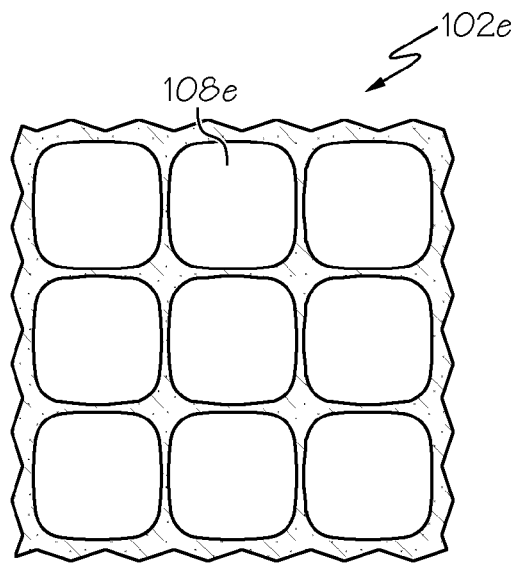
Figure 11:
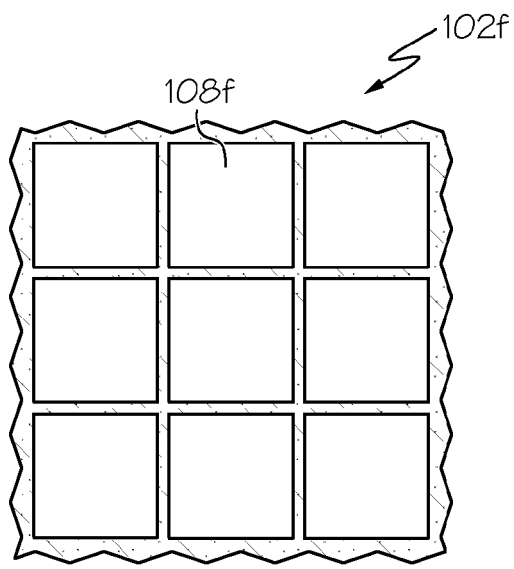

FIGS. 10 and 11 are representative of honeycomb ceramic substrates 102e-f having a flow channel density of 93 channels/cm² (600 channels/in²) and a thickness of the plurality of channel walls 110 between adjacent ones of the flow channels 108 of 571.5 microns (0.0225 inches). However, FIG. 10 represents a honeycomb ceramic substrate 102e with n and m equaling 3.6, while FIG. 11 represents a honeycomb ceramic substrate 102f with n and m equaling 42.

Figure 12:
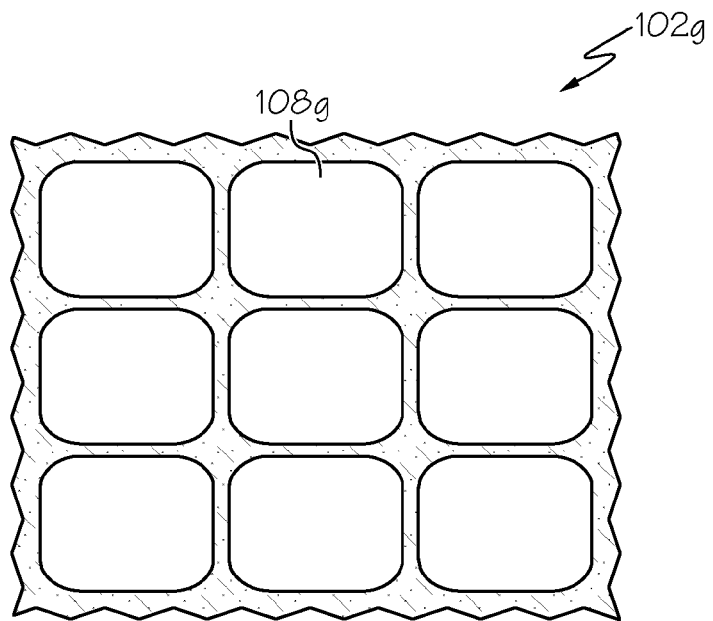

FIG. 12 represents a honeycomb ceramic substrate 102 having a flow channel density of 62.78 channels/cm² (405 channels/in²) and a thickness of the plurality of channel walls 110 between adjacent ones of the flow channels 108 of 1.0668 mm (0.042 inches). However, FIG. 12 represents a honeycomb ceramic substrate 102 with n equaling 4 and m equaling 8, thereby producing flow channels 108 with a rectangular-like shape, rather than a square-like shape.

The concavity of the inner surfaces 116 may compensate for some of the open area of the flow channel 108 that is lost due to the curved flow channel shape. Flow channel density and the thickness of the channel walls 110 between adjacent flow channels 108 may additionally be selected to optimize flow channel shape for a desired GSA. Further, the concavity of the inner surfaces 116 may provide the flow channels 108 with increased strength and resistance to buckling and rotational failures by increasing a moment of inertia, or decreasing a slenderness ratio, of each of the channel walls 110. This increased strength may afford reduced thicknesses of the channel walls 110 between adjacent flow channels 108, thereby further optimizing open frontal area and reduction of weight of the honeycomb ceramic substrate 102.

In an example, Table 1 compares square flow channels in a honeycomb ceramic substrate having a channel density of 93 channels/cm² (600 channels/in²) with elliptical flow channels in a honeycomb ceramic substrate having n and m equal to 3.5 with a channel density of 93 channels/cm² (600 channels/in²).

TABLE 1

| | Flow Channel Density | |
|---|---|---|
| | 93 channels/cm² (600 channels/in²) Square | 93 channels/cm² (600 channels/in²) n and m = 3.5 |
| Channel Wall Thickness Between Flow Channels | 76.2 microns (0.003 inches) | 76.2 microns (0.003 inches) |
| Equivalent Fillet Radius of Channel Walls | 76.2 microns (0.003 inches) | 254 microns (0.01 inches) |
| MIF (uncoated) | 0.69 | 1.24 |

While an equivalent fillet radius of the channel walls is greater in the elliptical flow channel than in the square flow channel, a mechanical integrity factor (MIF) of the elliptical flow channel is greater than an MIF of the square flow channel. The MIF, represented by Equation (II) below, is a dimensionless structural property that is directly proportional to a load carrying capability parallel to the channel walls and along a diagonal of the flow channel, where "t" is the channel wall thickness between flow channels, "l" is the distance between channel wall centers, and "R" is the effective corner radius, as is illustrated in FIGS. 4 and 5. The MIF is derived by equating a maximum bending stress at a midpoint of the channel walls or at an intersection of the channel walls to channel wall strength.

$$MIF*100 = t/l*(t/(1-t-2*R))*100 \qquad (II)$$

Further, the equivalent fillet radius of the channel walls is defined by the group of equations listed below in Table 2, where "a", "b", and "c" represent the three sides of a triangle, "A" is the area of the triangle, and "r" is the equivalent fillet radius of the channel walls.

TABLE 2

$a = \text{sqrt}((x1 - x2)^2 + (y1 - y2)^2)$
$b = \text{sqrt}((x2 - x3)^2 + (y2 - y3)^2)$
$a = \text{sqrt}((x3 - x1)^2 + (y3 - y1)^2)$
$s = (a + b + c)/2$
$A = \text{sqrt}(s * (s - a) * (s - b) * (s - c))$
$r = a * b * c/(4 * A)$ Table 3 compares other strength advantages of elliptical flow channels over square flow channels based on other product variants. For example, a slenderness ratio is used to compare the strength of the channel walls. Smaller slenderness ratios are more resistant to failures at equivalent loadings. Additionally to be noted is the fact that the channel wall thickness between the elliptical flow channels is less than the channel wall thickness between the square flow channels. When the square and elliptical flow channels having equivalent flow channel densities are compared, the elliptical flow channel having a thinner channel wall has a lower slenderness ratio than the comparable square flow channel having a thicker channel wall. In other words, the elliptical flow channel designs have the lower slenderness ratios, which indicates a higher resistance to buckling loading. Buckling failure is often seen in the extrusion of substrates having thin channel walls when adjacent channel wall velocities are not uniform. Buckling failure is one of the principle reasons for rejected extruded ware.

Figure 14:
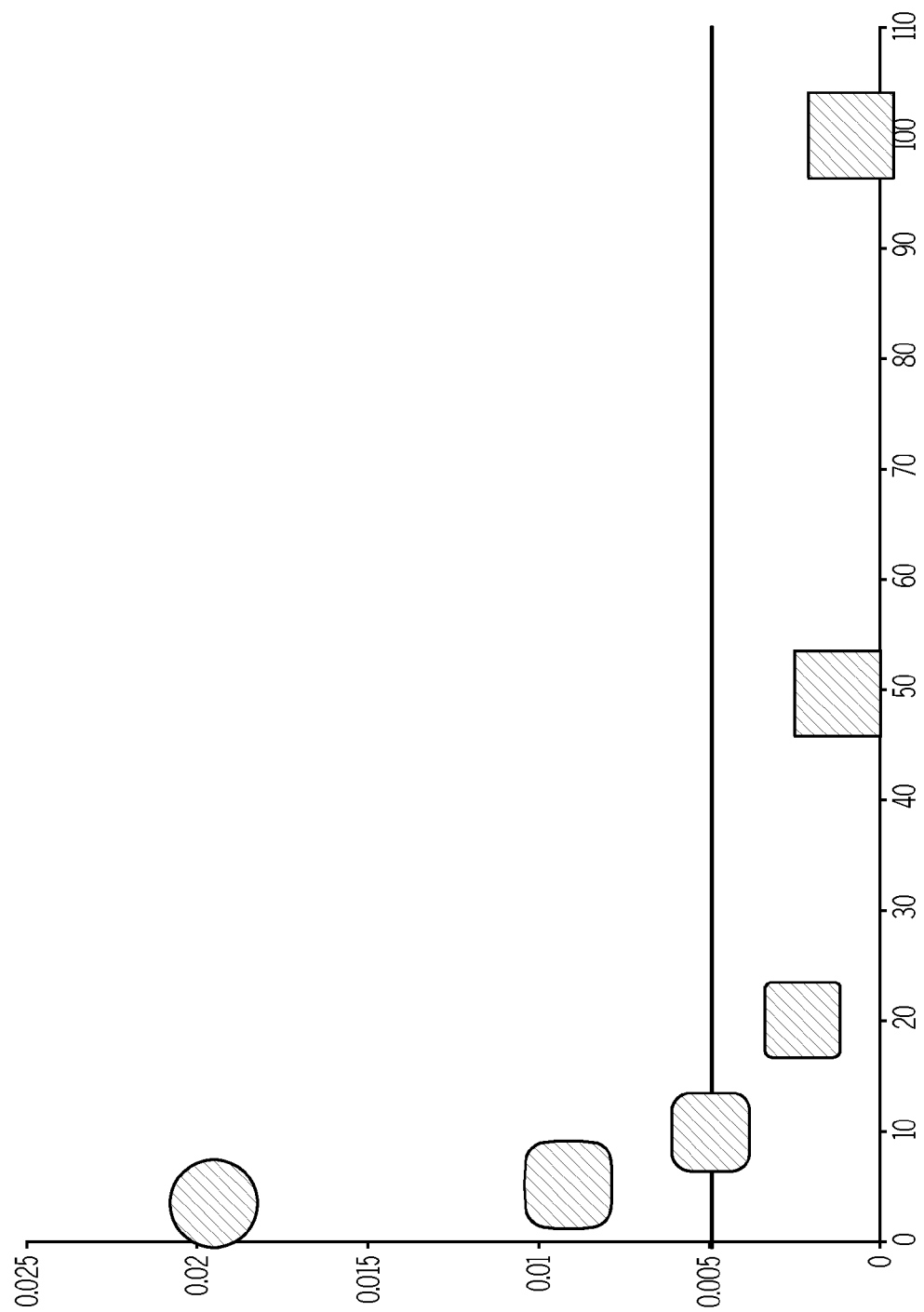
FIG. 14 is a graphical view illustrating an example of an impact of exponents defining a degree of curvature of a flow channel of the honeycomb ceramic substrate on a resistance of the flow channel to chipping as evidenced by an effective additional web attachment length in accordance with example aspects of the disclosure.
Figure 15:
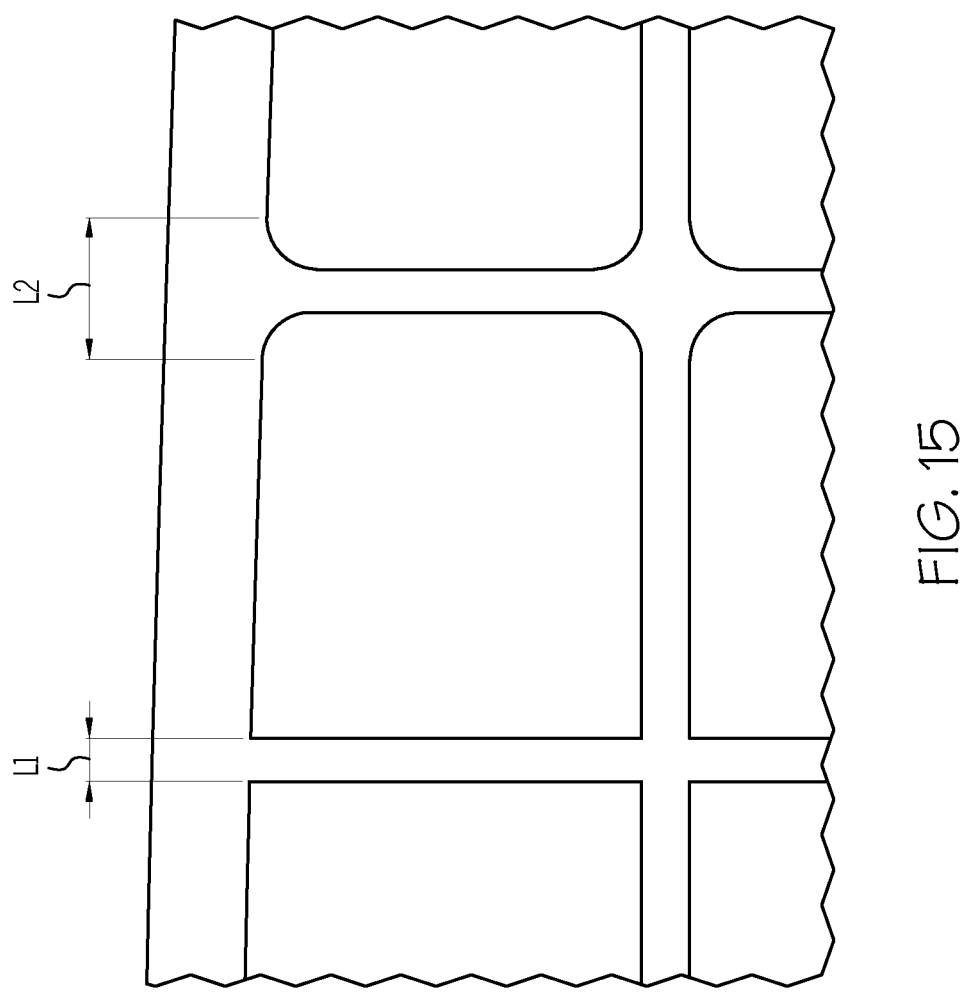
FIG. 15 is a enlarged view illustrating an example of the honeycomb ceramic substrate in accordance with example aspects with respect to effective additional channel wall thickness.

FIG. 14 is a graphical view illustrating an example of an impact of exponents defining a degree of curvature of a flow channel of the honeycomb ceramic substrate on a resistance of the flow channel to chipping as evidenced by an effective additional channel wall thickness attachment length in accordance with example aspects of the disclosure. As shown in FIG. 14, the vertical axis is the effective additional channel wall thickness attachment length (in inches) and the horizontal axis demonstrates the exponents m and n (that are the same). Example attachment lengths are schematically illustrated in FIG. 15. For example, when the channel wall thickness has an effective additional attachment length L2 of 127 microns (0.005 inches) or greater, a clear resistance to chipping is shown when compared to smaller attachment lengths L1. It is noted that an elliptical flow channel having a lower value of m and n has a greater effective additional attachment length.

Figure 16:
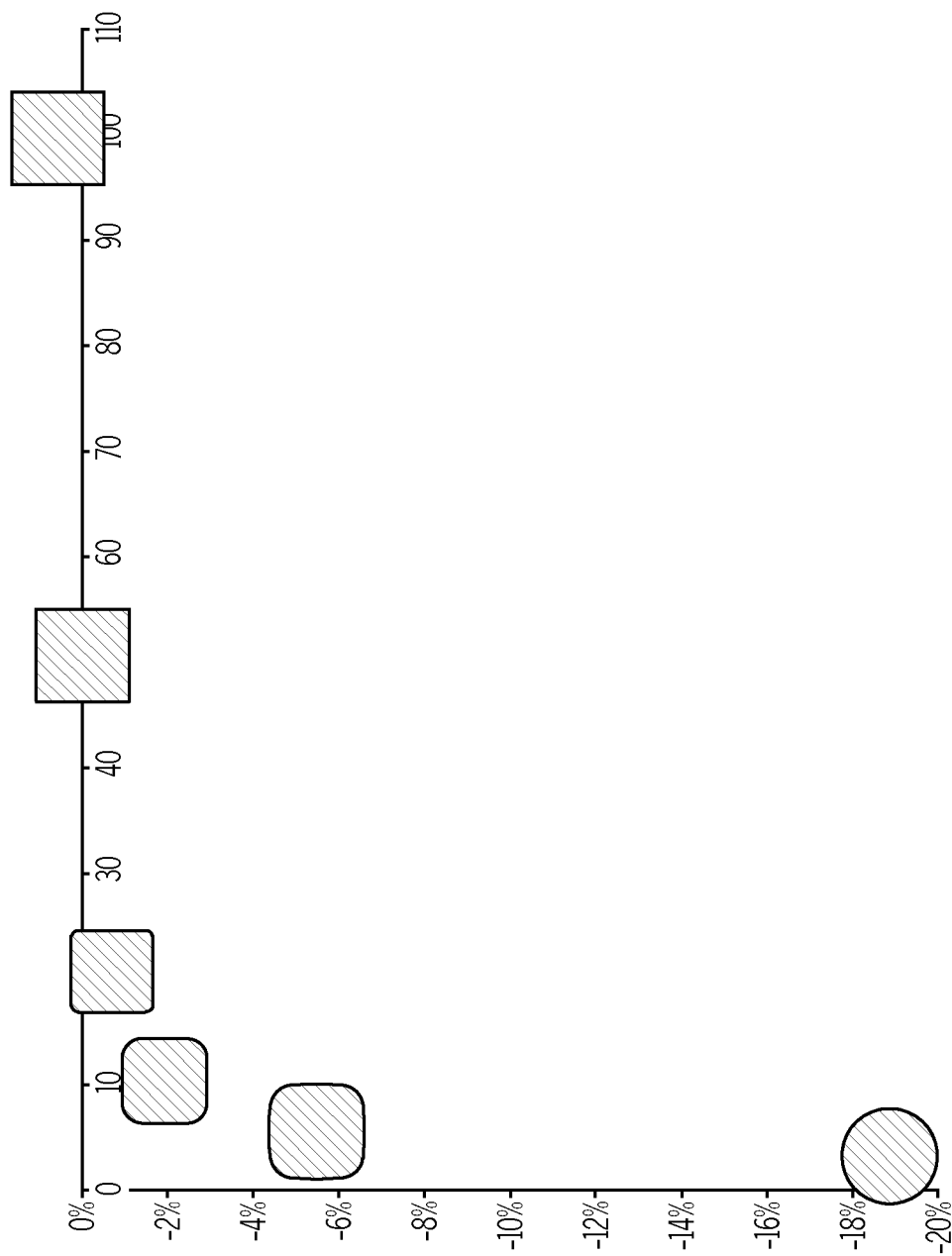
FIG. 16 is a graphical view illustrating an example of an impact of exponents defining a degree of curvature of a flow channel of the honeycomb ceramic substrate on a percentage of reduction in an open frontal area of the flow channel in accordance with example aspects of the disclosure.

FIG. 16 is a graphical view illustrating an example of an impact of exponents defining a degree of curvature of a flow

TABLE 3

| Flow Channel Density - channels/cm² (channels/in²) | 93 (600) | 93 (600) | 69.75 (450) | 62 (400) | 62 (400) | 139.5 (900) | 139.5 (900) |
|---|---|---|---|---|---|---|---|
| Channel Wall Thickness Between Flow Channels - microns (inches) | 88.9 (0.0035) | 57.15 (0.00225) | 57.15 (0.00225) | 88.9 (0.0035) | 106.68 (0.0042) | 68.58 (0.0027) | 57.15 (0.00225) |
| Flow Channel Shape | Square | Elliptical | Elliptical | Square | Square | Square | Elliptical |
| Distance Between Channel Wall Centers - mm (inches) | 1.036 (0.0408) | 1.036 (0.0408) | 1.197 (0.04714) | 1.270 (0.05) | 1.270 (0.05) | 0.847 (0.03333) | 0.847 (0.03333) |
| Radius of Gyration X - microns (inches) | 269.2 (0.0106) | 342.9 (0.0135) | 403.9 (0.0159) | 315.0 (0.0124) | 327.7 (0.0129) | 215.9 (0.0085) | 241.3 (0.0095) |
| Slenderness Ratio | 1.92 | 1.51 | 1.48 | 2.02 | 1.94 | 1.96 | 1.75 |

The Slenderness Ratio is the quotient of the distance between the channel wall centers, the radius of gyration around the x-axis, and 2. The Slenderness Ratio is applied to determine the critical buckling stress 6 between the channel wall centers, as is shown in Equation (III) below.

$$\sigma = \pi^2 E / (\text{Slenderness Ratio}) \quad (III)$$

where E is the Young's modulus of the channel wall material.

Figure 13:
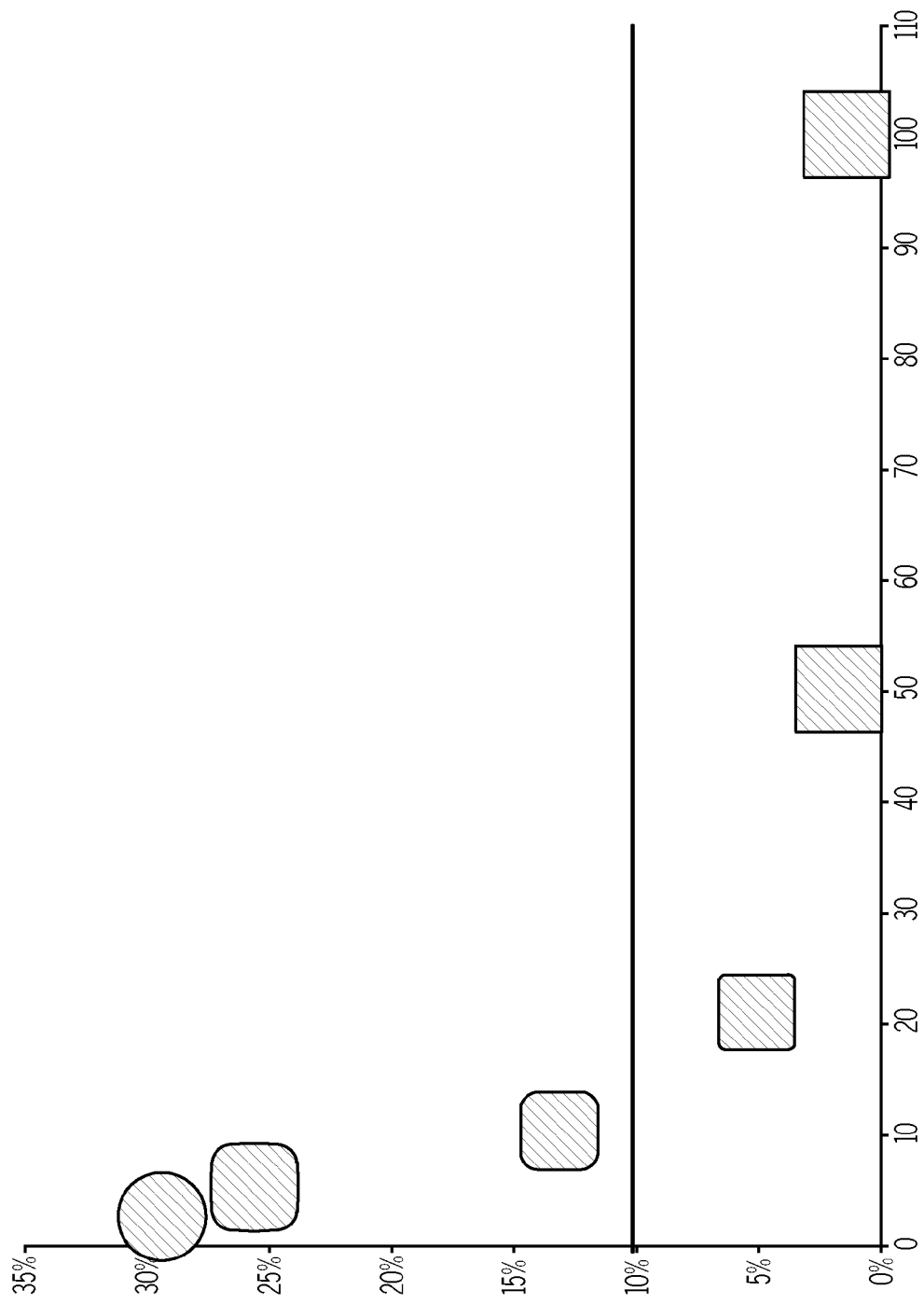
FIG. 13 is a graphical view illustrating an example of an impact of exponents defining a degree of curvature of a flow channel of the honeycomb ceramic substrate on a change in inertia of the flow channel in accordance with example aspects of the disclosure.

FIG. 13 is a graphical view illustrating an example of an impact of exponents defining a degree of curvature of a flow channel of the honeycomb ceramic substrate on a change in inertia of the flow channel in accordance with example aspects of the disclosure. As shown FIG. 13, the vertical axis is the percent change in inertia while the horizontal axis demonstrates the exponents m and n (that are the same). Change in inertia is a measurement used to determine resistance of a flow channel to buckling of the channel walls. For example, when a flow channel has a higher percentage of change in inertia, it is more likely to be a stronger flow channel and have channel walls that are less subject to buckling. It is noted an elliptical flow channel having a lower value of m and n has a greater percentage of change in inertia.

channel of the honeycomb ceramic substrate on a percentage of reduction in an OFA of the flow channel in accordance with example aspects of the disclosure. As shown in FIG. 16, the vertical axis is the percent difference in open area while the horizontal axis demonstrates the exponents m and n (that are the same). While lower n and m values promote greater strength in flow channels than higher n and m values, FIG. 16 demonstrates that higher n and m values provide a greater flow channel OFA, which relates to the catalyst performance of a flow channel.

Figure 17:
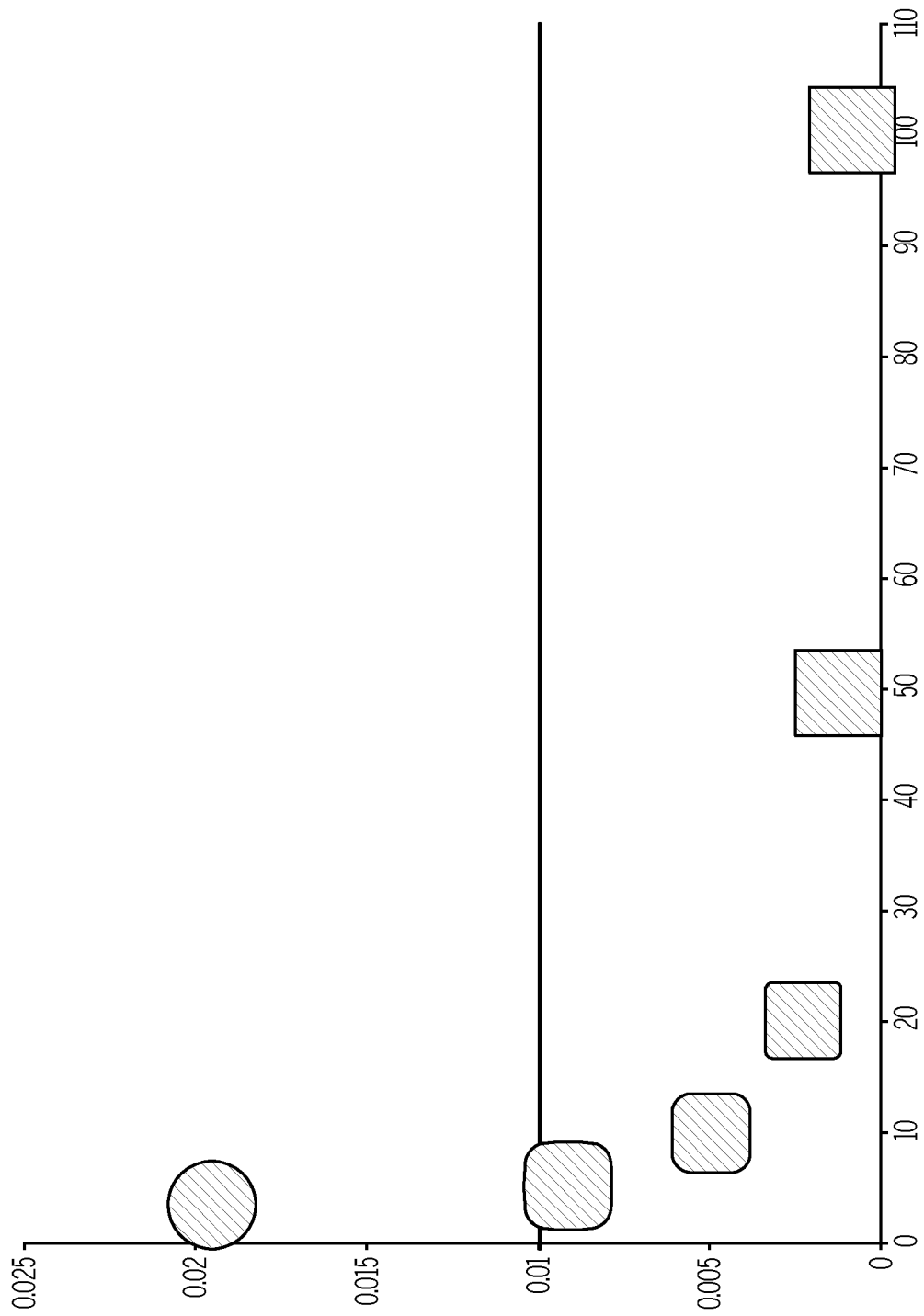
FIG. 17 is a graphical view illustrating an example of an impact of exponents defining a degree of curvature of a flow channel of the honeycomb ceramic substrate on an effective corner radius for washcoat efficiency of the flow channel in accordance with example aspects of the disclosure.

FIG. 17 is a graphical view illustrating an example of an impact of exponents defining a degree of curvature of a flow channel of the honeycomb ceramic substrate on an effective corner radius for washcoat efficiency of the flow channel in accordance with example aspects of the disclosure. As shown in FIG. 17, the vertical axis is the effective corner radius (inches) while the horizontal axis demonstrates the exponents m and n (that are the same). For example, measurements of coated substrates show a minimum of a 254 micron (0.010 inch) washcoat radius after coating. It is noted that an elliptical flow channel having a lower value of m and n has a greater uniformity of washcoat coating.

In addition, Table 4 highlights several performance attributes of an elliptical flow channel having a channel density of 69.75 channels/cm² (450 channels/in²), a channel wall thickness between flow channels of 63.5 microns (0.0025 inches), and m and n values equal to 3.6 in comparison with alternative hexagonal and square flow channels. Of note, the elliptical flow channel substantially matches the hexagonal flow channel's exhaust performance characteristics while providing close to 40% increased strength over the hexagonal flow channel.

TABLE 4

| Flow Channel Shape | Hexagonal | Square | Elliptical, n and m = 3.6 |
|---|---|---|---|
| Flow Channel Density - channels/cm² (channels/in²) | 93 (600) | 93 (600) | 69.75 (450) |
| Channel Wall Thickness Between Flow Channels - microns (inches) | 76.2 (0.003) | 76.2 (0.003) | 63.5 (0.0025) |
| Equivalent Fillet Radius of Channel Walls - microns (inches) | 76.2 (0.003) | 76.2 (0.003) | 304.8 (0.012) |
| OFA (coated) | 0.84 | 0.78 | 0.84 |
| GSA (coated) | 31.6 | 35.3 | 31.3 |
| MIF (uncoated) | 0.46 | 0.69 | 0.64 |
| Resistance to Flow (RTF) (coated) | 491 | 709 | 452 |

The OFA, the GSA, and RTF are calculated as is provided in Equations (IV), (V), and (VI) below, respectively. The OFA is used to compare substrates for back pressure. The GSA is used to compare substrates for conversion efficiency. For example, a higher GSA translates into a higher conversion efficiency or capability for the substrate. The RTF is a measure of the resistance to flow through the channels.

$$OFA = (1-t/L)^2 - (4-\pi)(R/L)^2 \quad (IV)$$

where "t" is the channel wall thickness between flow channels, "L" is the distance between channel wall centers, and "R" is the effective corner radius, as is illustrated in FIGS. 4 and 5.

$$GSA = (4(L-t)/L^2) - (((8-2\pi)R)/L^2) \quad (V)$$

where "t" is the channel wall thickness between flow channels, "L" is the distance between channel wall centers, and "R" is the effective corner radius, as is illustrated in FIGS. 4 and 5.

$$RTF = 2f/((OFA*Dh^2)w) \quad (VI)$$

where "f" is the fanning friction factor, "Dh" is the hydraulic diameter of the flow channel, and "w" is the width Table 5 highlights further variants of the elliptical flow channel concept. As Table 5 shows, the elliptical flow channel is designed to allow thinner channel wall thicknesses while maintaining equivalent product strength and improving OFA and GSA on a 900 channel/inch substrate.

TABLE 5

| Flow Channel Shape | Square | Elliptical |
|---|---|---|
| Flow Channel Density - channels/cm² (channels/in²) | 139.5 (900) | 139.5 (900) |
| Channel Wall Thickness Between Flow Channels - microns (inches) | 68.58 (0.0027) | 57.15 (0.00225) |
| Equivalent Fillet | 50.8 (0.002) | 124.46 (0.0049) |

TABLE 5-continued

| Flow Channel Shape | Square | Elliptical |
|---|---|---|
| Radius of Channel Walls - microns (inches) | | |
| OFA (coated) | 84.2 | 86 |
| GSA (coated) | 43.3 | 43.8 |
| MIF (uncoated) | 0.74 | 0.72 |
| RTF (coated) | 867 | 857 |

Equation (I) may also be translated into x and y coordinates to yield Equation (VII) and Equation (VIII), respectively.

$$x(t) = \pm a \cdot |\cos(t)|^{\left(\frac{2}{n}\right)} \quad (VII)$$

where $a = a$ for $0 \leq t \leq \frac{\pi}{2}$ and $\frac{3\pi}{2} \leq t \leq 2\pi$;

$a = -a$ for $\frac{\pi}{2} < t < 3\pi/2$ $$y(t) = \pm b \cdot |\sin(t)|^{\left(\frac{2}{m}\right)} \quad (VIII)$$

where $b = b$ for $0 \leq t \leq \pi$ and $b = -b$ for $\pi < t < 2n$

Figure 18:
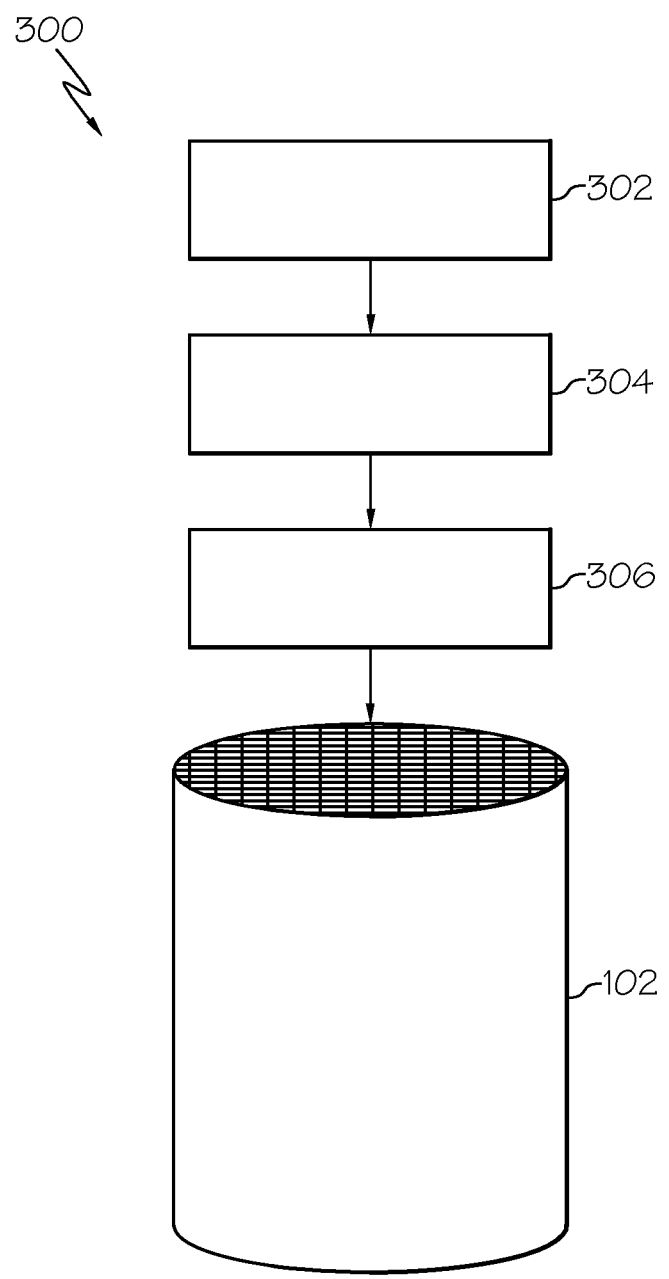
FIG. 18 is a flow diagram illustrating an example of a method of making a honeycomb ceramic substrate in accordance with example aspects of the disclosure.

FIG. 18 is a flow diagram illustrating an example of a method 300 of making a honeycomb ceramic substrate in accordance with example aspects of the disclosure. FIG. 19 is a schematic view illustrating an example of an extrusion apparatus 400 in accordance with example aspects of the disclosure. FIG. 20 is an enlarged partial schematic sectional view illustrating an example of a honeycomb extrusion die 408 in accordance with example aspects of the disclosure taken at view 20 of FIG. 19.

Referring to FIGS. 18-20, the method 300 includes extruding 302 a ceramic or ceramic-forming batch material 402 through a honeycomb extrusion die 408 to form green honeycomb substrate of potentially unlimited length. The extruding 302 may be performed by introducing the ceramic or ceramic-forming batch material 402 into an input portion 404 of an extruding device 406. Once the desired length is achieved, a cutter (not shown) can be used to sever the extruded ceramic or ceramic-forming substrate to provide the substrate with the desired length.

As shown, in one example, the extruding device 406 can include a twin-screw extruder including twin screws 410a, 410b configured to be rotated by respective motors 412a, 412b to mix and compress the batch 402 of ceramic or ceramic-forming batch material as it travels along a path 414 toward the honeycomb extrusion die 408. The extruding device 406 includes an extrusion axis wherein the ceramic-forming substrate can be extruded from the honeycomb extrusion die 408 along an extrusion direction substantially parallel to the extrusion axis.

Figure 21:
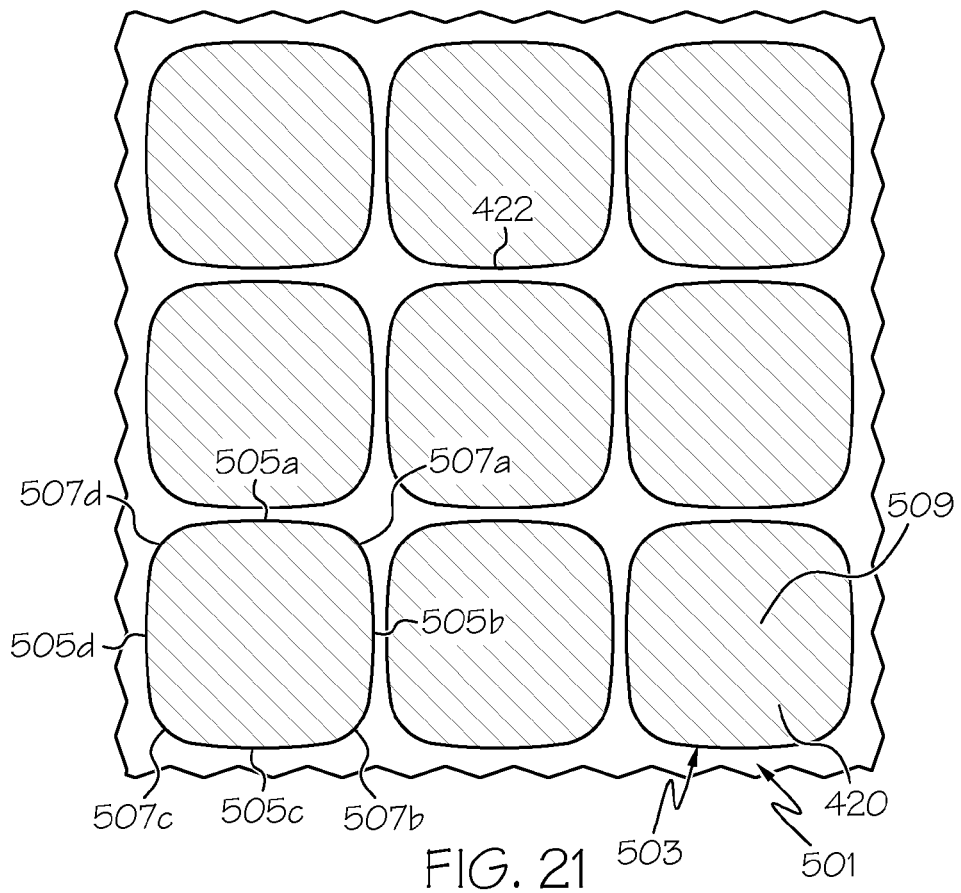
FIG. 21 is a partial sectional view of the die member along line 21-21 of FIG. 20.
Figure 22:
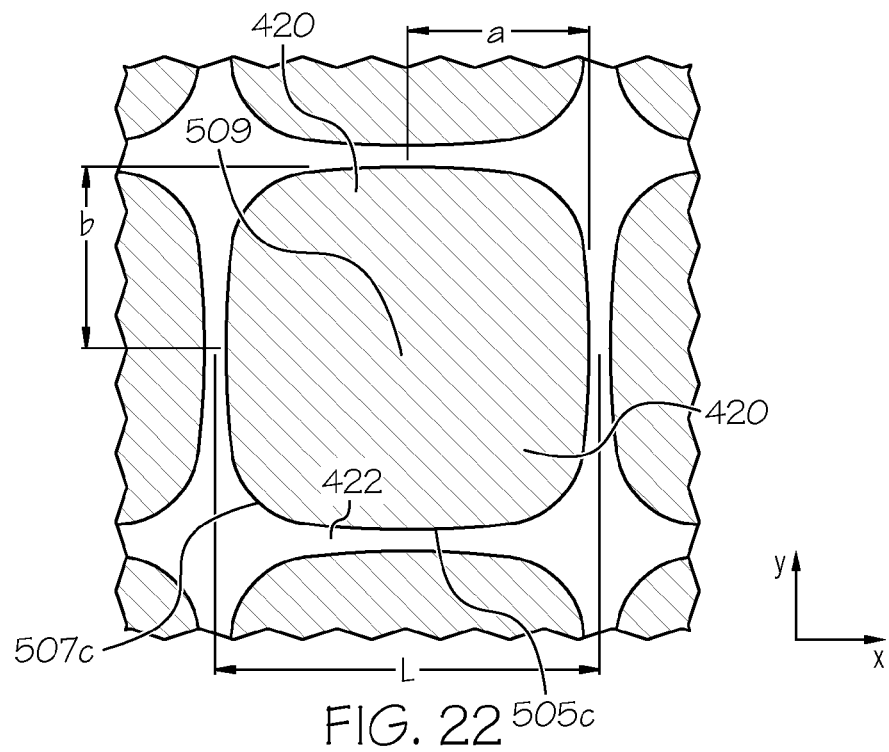
FIG. 22 is an enlarged view of portions of FIG. 21.

As shown in FIG. 20, the die member 408 includes feed holes 416 configured to feed batch material 402 in direction 418, along the path 414, toward a plurality of die pins 420. The die pins 420 are arranged in a matrix and spaced apart from one another to define a lattice of intersecting slots 422 defined between the die pins 420 at an outer face of the die pins 420. As shown in FIGS. 21-22, an outer periphery 501 at an outer face 503 of at least one of the die pins 420 includes a plurality of sides 505a-d joined by corresponding corner portions 507a-d with at least two convex sides facing away from a center 509 of the corresponding die pin 420 from central portions of the convex sides to the corresponding end portions of the convex sides. At least one corner portion 507a-d is convex facing away from the center 509 of the corresponding die pin 420. The slots 422 are designed to form the channel walls 110 of the honeycomb ceramic substrate 102 as the ceramic-forming batch material 402 is drawn into the honeycomb ceramic substrate 102.

At least one wall slot 422 may be defined between facing sides (e.g., 505a/505c, 505b/505d, 505c/505a, 505d/505b) of two adjacent die pins of the plurality of die pins 420. As shown, each of the facing sides may be convex facing each other from central portions thereof to corresponding end portions of the facing sides. Consequently, the wall slot 422 defined therebetween, may be concave toward central portions of the two adjacent die pins.

For example, with reference to the die pin shown in FIG. 22, a shape of the outer periphery 501 of the outer face 503 of one of the die pins 420 can be substantially defined by Equation (I).

$$\left|\frac{x}{a}\right|^n + \left|\frac{y}{b}\right|^m = 1 \quad (I)$$

As is somewhat inversely illustrated in FIGS. 4 and 5, a and b are rectangular-fitted half-lengths along an x direction and a y direction, respectively, of the sides 505a-d of the die pins 420 on either side of a y axis and an x axis, respectively. x and y represent coordinates (x, y) of the sides of the die pins 420 in the x direction and the y direction, respectively. Further, −a≤x≤a and −b≤y≤b. Moreover, n and m are exponents defining a degree of curvature of the sides of the die pins 420.

In an example, at least one of n and m may be in a range of from about 2.5 to about 10. In another example, a and b may be independently in a range of from about 330 microns (0.013 inches) to about 1.829 mm (0.072 inches). In a further example, the die pins 420 may be arranged in the matrix and spaced from one another to have a die pin density in a range of from about 7.75 die pins/cm² (50 die pins/in²) to about 232.5 die pins/cm² (1500 die pins/in²). In an additional example, a thickness of the intersecting slots 422 between adjacent ones of the die pins 420 may be in a range of from about 25.4 microns (0.001 inches) to about 482.6 microns (0.019 inches).

In yet another example, the sides of each of the die pins 420 may have a length that is the same. Further, at least two of the sides of each of the die pins 420 may have a length that is the same. In still another example, the sides of each of the die pins 420 may be symmetric to each other. In addition, the sides and corner portions of each of the die pins 420 may be continuously curved around the center of the corresponding die pin 420.

In addition, the shape of the die pin 420 either may be the same or varied along an entire length of the die pin 420. For example, the shape of the die pin 420 on the outer face 503 may extend a depth of 127 microns (0.005 inches) from the outer face 503 along the length of the die pin 420, with the remaining length of the die pin 420 being formed in a different shape. In another example, the shape of die pin 420 on the outer face 503 may extend a depth of 30% to 50% of the length of the die pin 420 from the outer face 503 along the length of the die pin 420 while the remaining length of the die pin 420 is formed in a different shape. For instance, in one example, the die pins may be formed by Electrical Discharge Machining (EDM) wire machining the entire length of the die pin. After forming the initial die pin shape, a subsequent machining step may be carried out by plunge EDM machining an electrode having the desired shape of the die pin at the outer face of the die pin. In such examples, the plunge EDM may extend a depth of 127 microns (0.005 inches) and/or to a depth of from about 30% to about 50% of the length of the die pin. As such, the shape of the die pin at the outer face may comprise the shape of the electrode while the remaining shape is defined by the initial wire EDM machining procedure.

Turning back to FIG. 18, the method 300 can further include the step of drying 304 the green honeycomb substrate. Additionally, the method 300 can include the step of firing 306 the green honeycomb substrate into the honeycomb ceramic substrate 102.

Figure 24:
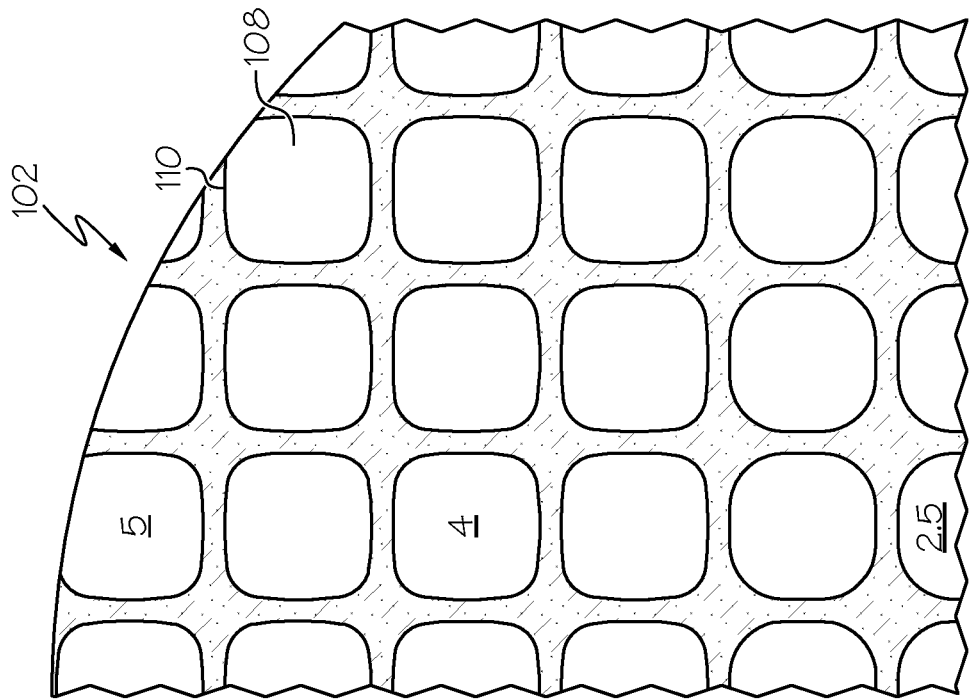
Figure 23:
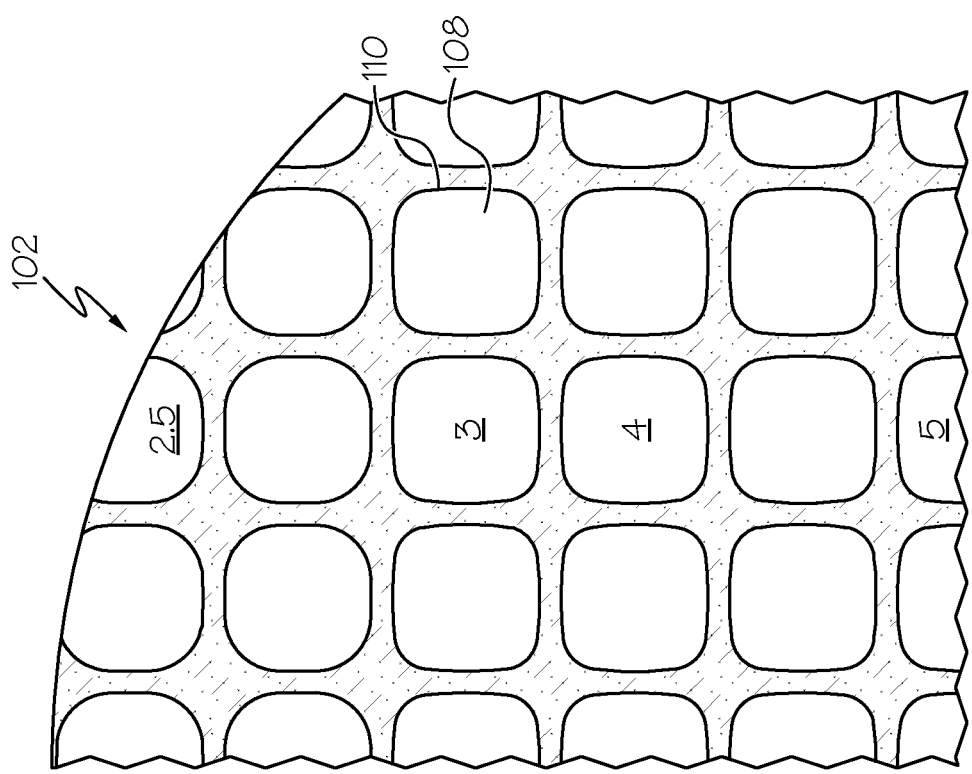

FIGS. 23-25 are enlarged views illustrating examples of the honeycomb ceramic substrate 102 in accordance with example aspects of the disclosure. Referring to FIGS. 23-25, the honeycomb ceramic substrate 102 is illustrated having flow channels 108 and channel walls 110 of varied shape and size. For example, exponents m and n of Equation (I) can be varied across the die pins 420 of a honeycomb extrusion die 408 to create a honeycomb ceramic substrate 102 with varying thicknesses of the channel walls 110 and varying areas of the flow channels 108.

Referring to FIG. 23, as an example, values of m and n may be decreased progressively from an internal portion of the honeycomb ceramic substrate 102 to a periphery of the honeycomb ceramic substrate 102. Such a design may serve to strengthen a peripheral portion of the honeycomb ceramic substrate 102 while maintaining a thickness of the channel walls 110 across the honeycomb ceramic substrate 102. The example illustrated in FIG. 24 shows that the values of m and n may also be increased progressively from an internal portion of the honeycomb ceramic substrate 102 to a periphery of the honeycomb ceramic substrate 102. This may provide a more uniform gas flow in a catalytic chamber by manipulating the OFA of the flow channels 108. In addition, as is illustrated in FIG. 25, exponents m and n can be increased or decreased abruptly in a specific section of the honeycomb ceramic substrate 102. This may serve to increase strength in the specific section of the honeycomb ceramic substrate 102 in which such an abrupt change is applied.

It will be apparent to those skilled in the art that various modifications and variations can be made to the present disclosure without departing from the spirit and scope of the disclosure. Thus, it is intended that the present disclosure cover the modifications and variations of this disclosure provided they come within the scope of the appended claims and their equivalents.

What is claimed is:
1. A honeycomb ceramic substrate, comprising:
   a lattice of intersecting walls defining a honeycomb network of flow channels extending between an inlet end and an outlet end of the honeycomb substrate, wherein a first flow channel is defined by a plurality of channel walls of the intersecting walls with at least two of the plurality of channel walls including concave inner surfaces facing a center of the first flow channel, the concave inner surfaces extending from central portions of each of the concave inner surfaces to concave corner portions facing the center of the first flow channel, the concave corner portions located on either end of each concave inner surface, the concave corner portions being where each of the plurality of channel walls intersects with another one of the plurality of channel walls wherein the concave inner surfaces of the channel walls are continuously curved towards the center throughout a length of the channel walls between corresponding ones of the corner portions, a second flow channel adjacent to the first flow channel and sharing a common channel wall, wherein one side of the common channel wall comprises a concave inner surface of the concave inner surfaces and an opposing side the common channel wall includes an opposing concave inner surface facing a center of the second flow channel.

2. The honeycomb ceramic substrate of claim 1, wherein a peripheral cross-sectional shape of at least one of the flow channels is substantially defined by the equation:

$$\left|\frac{x}{a}\right|^n + \left|\frac{y}{b}\right|^m = 1,$$

wherein a and b are rectangular-fitted half-lengths along an x direction and a y direction, respectively, of the inner surfaces of channel walls defining each flow channel on either side of a y axis and an x axis, respectively, wherein x and y represent coordinates (x, y) of the inner surfaces of the channel walls defining each flow channel in the x direction and the y direction, respectively, wherein $-a \le x \le a$, wherein $-b \le y \le b$, and wherein n and m are exponents defining a degree of curvature of the channel walls.

3. The honeycomb ceramic substrate of claim 2, wherein at least one of n and m is in a range of from about 2.5 to about 10.

4. The honeycomb ceramic substrate of claim 2, wherein a and b are independently in a range of from about 330 microns to about 1.829 mm.

5. The honeycomb ceramic substrate of claim 2, wherein n and m are varied across the plurality of flow channels.

6. The honeycomb ceramic substrate of claim 1, wherein the channel walls are continuously curving around the center of the corresponding flow channel.

* * * * *